(12) United States Patent
Rydén et al.

(10) Patent No.: US 10,656,241 B2
(45) Date of Patent: May 19, 2020

(54) METHODS AND APPARATUS FOR REPORTING RSTD VALUES

(71) Applicant: Telefonaktiebolaget LM Ericsson (publ), Stockholm (SE)

(72) Inventors: Henrik Rydén, Solna (SE); Fredrik Gunnarsson, Linköping (SE); Xingqin Lin, Santa Clara, CA (US); Sara Modarres Razavi, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/347,854

(22) PCT Filed: Nov. 30, 2017

(86) PCT No.: PCT/SE2017/051194
§ 371 (c)(1),
(2) Date: May 7, 2019

(87) PCT Pub. No.: WO2018/111173
PCT Pub. Date: Jun. 21, 2018

(65) Prior Publication Data
US 2019/0353748 A1 Nov. 21, 2019

Related U.S. Application Data

(60) Provisional application No. 62/432,757, filed on Dec. 12, 2016.

(51) Int. Cl.
*H04W 40/00* (2009.01)
*G01S 5/14* (2006.01)
*G01S 5/02* (2010.01)

(52) U.S. Cl.
CPC ............. *G01S 5/14* (2013.01); *G01S 5/0236* (2013.01)

(58) Field of Classification Search
CPC ......... H04J 11/00; H04W 64/00; H04W 8/26; H04W 64/003; H04W 72/0406;
(Continued)

(56) References Cited

U.S. PATENT DOCUMENTS

2011/0286349 A1* 11/2011 Tee ........................ H04W 24/10
370/252
2015/0263837 A1* 9/2015 Patel .................... H04L 27/0006
370/329
(Continued)

FOREIGN PATENT DOCUMENTS

WO 2015178830 A1 11/2015

OTHER PUBLICATIONS

3rd Generation Partnership Project, "3rd Generation Partnership Project; Technical Specification Group Radio Access Network; Evolved Universal Terrestrial Radio Access Network (E-UTRAN); Stage 2 Functional Specification of User Equipment (UE) Positioning in E-UTRAN (Release 13)", Technical Specification, 3GPP TS 36.305 V13.0.0, Dec. 1, 2015, pp. 1-69, 3GPP.
(Continued)

*Primary Examiner* — Dai Phuong
(74) *Attorney, Agent, or Firm* — Coats + Bennett, PLLC

(57) ABSTRACT

A method performed by a wireless device for reporting an RSTD value to a network node of a wireless communication network. The method includes receiving a configuration of positioning reference signals (PRSs) from the network node, the configuration indicating a plurality of PRS identities for respective transmission points (TPs) of the wireless communication network, determining an RSTD value for a TP based on the received configuration, and reporting the determined RSTD value for the TP to the network node. A first frequency reuse factor for the PRSs that is lower than a default second frequency reuse factor may be used.

16 Claims, 10 Drawing Sheets

(58) Field of Classification Search
CPC .... H04W 24/10; H04L 5/0048; H04L 5/0055; G01S 5/10; G01S 1/20; G01S 5/0036; G01S 5/0236
See application file for complete search history.

(56) References Cited

U.S. PATENT DOCUMENTS

2016/0345247 A1* 11/2016 Kim ................... H04W 48/16
2018/0270784 A1* 9/2018 Lee .................... H04J 11/00
2018/0294934 A1* 10/2018 Kim ................... H04L 5/005

OTHER PUBLICATIONS

Qualcomm et al., "Introduction of Further Indoor Positioning Enhancements", 3GPP TSG-RAN WG2 Meeting #96, Reno, Nevada, USA, Nov. 14, 2016, pp. 1-21, R2-169129, 3GPP.
3RD Generation Partnership Project, "3rd Generation Partnership Project; Technical Specification Group Radio Access Network; Evolved Universal Terrestrial Radio Access (E-UTRA); LTE Positioning Protocol (LPP) (Release 13)", Technical Specification, 3GPP TS 36.355 V13.2.0, Sep. 1, 2016, pp. 1-141, 3GPP.
Fischer, S., "Observed Time Difference of Arrival (OTDOA) Positioning in 3GPP LTE", Jun. 6, 2014, pp. 1-62, Qualcomm Technologies, Inc.
3RD Generation Partnership Project, "3rd Generation Partnership Project; Technical Specification Group Services and System Aspects; Functional Stage 2 Description of Location Services (LCS) (Release 13)", Technical Specification, 3GPP TS 23.271 V13.0.0, Sep. 1, 2015, pp. 1-172, 3GPP.

* cited by examiner

METHODS AND APPARATUS FOR REPORTING RSTD VALUES

TECHNICAL FIELD

The disclosure generally relates to the use of reference signal time difference (RSTD) for positioning, and particularly relates to a method for reporting RSTD values between a wireless device and a network node of a wireless communication network, and apparatus therefore.

BACKGROUND

The 3rd Generation Partnership Project (3GPP) is responsible for the standardization of Universal Mobile Telecommunication System (UMTS), and Long Term Evolution (LTE). LTE is also sometimes referred to as Evolved Universal Terrestrial Access Network (E-UTRAN). LTE is a technology for realizing high-speed packet-based communication that can reach high data rates both in the downlink and in the uplink, and is a next generation wireless communication system relative to UMTS. LTE brings significant improvements in capacity and performance over previous radio access technologies.

The Universal Terrestrial Radio Access Network (UTRAN) is the radio access network of a UMTS and E-UTRAN is the radio access network of an LTE system. In an UTRAN and an E-UTRAN, a wireless device, also called a User Equipment (UE), is wirelessly connected to a Radio Base Station (RBS) commonly referred to as a NodeB (NB) in UMTS, and as an evolved NodeB (eNodeB or eNB) in LTE. An RBS is a general term for a radio network node capable of transmitting radio signals to the UE and receiving signals transmitted by the UE. The area served by one or sometimes several RBSs may be referred to as a cell.

Wireless devices, which are referred to as UE in 3GPP terminology, may comprise, for example, cellular telephones, personal digital assistants, smart phones, laptop computers, handheld computers, machine-type communication/machine-to-machine (MTC/M2M) devices or other devices or terminals with wireless communication capabilities. Wireless devices may refer to terminals that are installed in fixed configurations, such as in certain machine-to-machine applications, as well as to portable devices, or devices installed in motor vehicles. Hereinafter, a wireless device may sometimes be referred to as a UE or simply as a device or terminal.

Location-based services and emergency call positioning drives the development of positioning in wireless networks and a plethora of applications and services in terminals take advantage of the position. Positioning in LTE is supported by the positioning architecture schematically illustrated in FIG. 1, with direct interactions between a UE and a location server, sometimes also referred to as an Evolved-Serving Mobile Location Centre (E-SMLC), via the LTE Positioning Protocol (LPP). The information transmitted between the location server and the UE will be handled by the eNodeB transparently, i.e., the eNodeB will control the transmission over the wireless link (LTE-Uu interface) to the UE but will not decode the actual information. Moreover, there are interactions between the location server and the eNodeB via the LPPa protocol, to some extent supported by interactions between the eNodeB and the UE via the Radio Resource Control (RRC) protocol. The E-SMLC is connected to the Mobility Management Entity (MME). An SLs interface is defined between the E-SMLC and MME and the MME is connected over the S1 interface to the eNB.

The following positioning techniques are considered in LTE (GPP TS 36.305 V13.0.0 (2015-12)):

Enhanced Cell ID: Essentially cell ID information to associate the UE to the serving area of a serving cell, and then additional information to determine a finer granularity position.

Assisted Global Navigation Satellite System (GNSS): GNSS information retrieved by the UE, supported by assistance information provided to the UE from E-SMLC.

Observed Time Difference of Arrival (OTDOA): The UE estimates the time difference of reference signals from different base stations and sends to the E-SMLC for multi-lateration.

Uplink Time Difference of Arrival (UTDOA): The UE is requested to transmit a specific waveform that is detected by multiple location measurement units (e.g. eNodeBs) at known positions. These measurements are forwarded to E-SM LC for multi-lateration The OTDOA is a UE-assisted method, in which the UE measures the time of arrival (TOA) of specific positioning reference signals (PRS) from multiple cells (or eNBs), and computes the relative differences between each cell and a reference cell. These reference signal time difference (RSTD) values are quantized and reported via LPP to the E-SMLC together with an accuracy assessment. Based on known positions of eNBs and their mutual time synchronization, it is possible for the E-SMLC to estimate the UE position from the RSTD values and covariance reports using multi-lateration. The accuracy depends on the radio conditions of the received signals, number of received signals, as well as the deployment, which means that the accuracy will vary spatially. FIG. 2 illustrates the multi-lateration in OTDOA when eNB1 is considered as the reference cell. For this case it is the measure of the relative difference between TOA of PRS from eNB3 and eNB1 (t3–t1) and the measure of the relative difference between TOA of PRS from eNB2 and eNB1 (t2–t1) that are relevant.

One of the factors which significantly impacts the performance of OTDOA, is the assumptions made for the UE receiver model and how it estimates the TOA.

How to Determine TOA

Wireless channels are usually modelled as multipath channels, meaning that the receiving node receives several distorted and delayed copies of the transmitted signal through multiple reflections and diffraction, etc. The multipath effect can be modelled by considering the following tapped delay link channel.

$$h(t) = \sum_{l=0}^{L} a_l \delta(t - \tau_l)$$

L is the number of multipath taps, i.e., number of signals received at the UE, $a_l$ denotes the complex attenuation of the l-th tap (i.e., attenuation of the l-th signal received), $\tau_l$ indicates the time delay of the l-th tap and $\delta(t)$ is the delta function, which is one when t=0 and zero otherwise. In order to determine geographical distance between the transmitter and receiver antennas, one should measure $\tau_0$ which is the time delay corresponding to the line-of-sight (LOS) tap, and scale it with the speed of light.

TOA of the signal can be measured based on a reference signal that is known to the receiver. Assuming that the transmitted signal is denoted "x(t)", then the received signal "y(t)" subject to multipath channel is given by $$y(t) = \sum_{l=0}^{L} a_l x(t - \tau_l) + w(t)$$

w(t) models additive noise and interference. Based on the received signal y(t) and the prior knowledge of the transmitted reference signal x(t), the receiver is interested in computing time delay of the first channel tap $\tau_0$, i.e., TOA of the LOS signal or the signal that arrives earliest if there is no LOS, since that translates to the distance between transmitter and receiver. However, since the received signal is embedded in noise and interference, it is not always easy to determine the first channel tap if it is not strong enough, which is usually the case in indoor scenarios.

There can be different methods to determine TOA at the receiver. A simple and widely used method is to cross-correlate the received signal with the known transmitted reference signal, $$R[\tau] = \sum_{i=0}^{K} y[i] x^*[i - \tau],$$

where K is the length of the received signal discrete domain representation. The cross-correlation function $R(\tau)$ gives channel impulse response. The absolute value of $R(\tau)$ corresponds to the Power Delay Profile (PDP) of the channel. The next step is to determine the first channel tap, which can be estimated by determining the first peak in $R[\tau]$ that is above a certain threshold $\zeta$.

$$\hat{\tau} = \operatorname{argmin}\left\{ \frac{|R[\tau]|}{\max\{|R|\}} \geq \zeta \right\}.$$

Finding the LOS component based on the cross-correlation as discussed above, is not an easy task for a UE. The UE needs to find a proper threshold in order to find the LOS component since the LOS tap is typically not the strongest tap. If the threshold is too low, the receiver can falsely detect noise as first channel tap and if the threshold is too high, the receiver may miss a weak LOS signal. Therefore, there is typically a trade-off between LOS detection and robustness to noise. In general, a higher SINR can improve the robustness to detect an LOS peak, that is, a higher SINR can mitigate the TOA estimation error caused by a strong non-LOS (N LOS) signal component.

For example, FIGS. 3a and 3b show situations where a UE fails to estimate a proper TOA when using a threshold-based peak detection. The graphs show how the cross-correlation values depend on the distance. The threshold is in the figures illustrated by a horizontal solid line (max peak/2). In FIG. 3a the leftmost vertical line (exact time) indicates the exact time (corresponding to a distance in meters) of the peak corresponding to the TOA of the LOS signal, and the rightmost vertical line (estimated) indicates the estimated time of the peak corresponding to the TOA of the LOS signal. In FIG. 3b it is the opposite and the leftmost vertical line (estimated time) indicates the estimated time of the peak corresponding to the TOA of the LOS signal, and the rightmost vertical line (exact time) indicates the exact time of the peak corresponding to the TOA of the LOS signal. These two example situations thus indicate some problems with a threshold-based peak detection. FIG. 3a exemplifies a situation where a lower threshold value would have improved the TOA estimation considerably. FIG. 3b exemplifies a situation where a higher threshold value would have improved the TOA estimation considerably.

PRS and PRS Configuration

In principle, it is possible to measure RSTD on any downlink signals, such as Cell-specific Reference Signals (CRS). However, in OTDOA the UE requires a detection of multiple neighbor-cell signals, and the CRS suffer from poor hearability and is therefore not suitable. Hence, PRSs have been introduced to improve OTDOA positioning performance. FIG. 4a and FIG. 4b illustrate the arrangement of the PRS assigned resources (black squares) for one resource block (RB) and for two different antenna port configurations using normal Cyclic Prefix (CP) and extended CP respectively. In such PRS subframes, no Physical Downlink Shared Channel (PDSCH) data is carried in order to reduce the interference with neighbor cells. Physical Downlink Control Channel (PDCCH) and CRSs are retained in the subframe, while PRSs are distributed in a "diagonal" way between CRSs. Alike CRS, a cell-specific frequency shift is applied to the PRS pattern. The number of frequency shifts is given by Physical Cell Identity (PCI) modulo 6, for avoiding time-frequency PRS collisions in up to six neighbor cells. Using a PRS pattern with a frequency shift given by PCI modulo 6 results in a frequency reuse factor of six. The frequency reuse factor is the rate at which the same PRS frequency can be used in the network. It is denoted K (sometimes 1/K) where K is the number of cells which cannot use the same frequencies for PRS transmission. A higher frequency reuse factor provides less time-frequency resource collisions for PRS, at the cost of less PRS resources per cell. Less PRS resources in a cell causes lower Signal to Interference and Noise Ratio (SINR).

The PRS sequence that is transmitted on antenna port 6 is created using the pseudo-random sequence generator that is initialized with:

$$c_{init} = 2^{10} \cdot (7 \cdot (n_s + 1) + l + 1) \cdot (2 \cdot N_{ID}^{cell} + 1) + 2 \cdot N_{ID}^{cell} + N_{CP}$$

$$N_{CP} = \begin{cases} 1 & \text{for normal } CP \\ 0 & \text{for extended } CP \end{cases}$$

where $N_{ID}^{cell}$ denotes the PCI of the Transmission Point (TP) that transmits the PRS, $n_s$ corresponds to the slot index within the radio frame, and l indexes the OFDM symbol within the slot.

New PRS Sequence Generation

For OTDOA, 3GPP has reached an agreement for a new PRS sequence and frequency shift ($V_{shift}$) generation per TP introduced in Rel.14. The pseudo-random sequence generator shall be initialized with:

$$c_{init} = 2^{28} \cdot \left\lfloor \frac{N_{ID}^{PRS}}{512} \right\rfloor + 2^{10} \cdot (7 \cdot (n_s + 1) + l + 1) \cdot (2 \cdot (N_{ID}^{PRS} \bmod 512) + 1) +$$

$$2 \cdot (N_{ID}^{PRS} \bmod 512) + N_{CP}$$

where the quantity $N_{ID}^{PRS}$ equals cell $N_{ID}^{cell}$ unless configured otherwise by higher layers. $N_{ID}^{PRS}$ is a value of a PRS identity, hereinafter referred to as prsID, which is a special identity of the PRS sequence as such, uncoupled from the cell (with a certain PCI corresponding to the cell $N_{ID}^{cell}$) that transmits the PRS sequence. In a similar way, the cell-specific frequency shift is given by $v_{shift} = N_{ID}^{PRS} \bmod 6$, where the quantity $N_{ID}^{PRS}$ equals $N_{ID}^{cell}$ unless configured otherwise by higher layers. The range of the prsID values or $N_{ID}^{PRS}$ is 0 to 4095. The new PRS sequence generation in Rel.14 is introduced to decouple the PRS from the PCI by introducing the prsID $N_{ID}^{PRS}$. This is performed in order to support more PRS sequences and to enable TPs with an associated macro cell in a shared cell identity scenario to be assigned with orthogonal PRS sequences. In a shared cell identity scenario, the same PCI is shared by multiple TPs. The current signaling proposal to enable the use of prsID with value $N_{ID}^{PRS}$ is detailed in 3GPP R2-166548, "*CR on OTDOA Enhancements for the Shared Cell-ID Scenario*".

The IE OTDOA-ProvideAssistanceData is used by the location server to provide assistance data to enable UE assisted downlink OTDOA. One of the OTDOA Assistance Data Elements is the IE PRS-Info which provides the information related to the configuration of PRS in a cell. PRS-Info is according to the proposal extended as follows (new parts in bold):

```
-- ASN1START
PRS-Info ::= SEQUENCE {
    prs-Bandwidth         ENUMERATED { n6, n15, n25, n50, n75, n100, ... },
    prs-ConfigurationIndex INTEGER (0..4095),
    numDL-Frames          ENUMERATED {sf-1, sf-2, sf-4, sf-6, ...},
    ...,
    prs-MutingInfo-r9     CHOICE {
        po2-r9                BIT STRING (SIZE(2)),
        po4-r9                BIT STRING (SIZE(4)),
        po8-r9                BIT STRING (SIZE(8)),
        po16-r9               BIT STRING (SIZE(16)),
        ...
    }                                          OPTIONAL   -- Need
OP  [[ prsID-r14           INTEGER (0..4095)   OPTIONAL,  --
Need ON
    ]]
}
-- ASN1STOP
```

Another of the OTDOA Assistance Data Elements is the IE OTDOA-ReferenceCellInfo which is used by the location server to provide assistance data related to reference cell information. The OTDOA-referenceCellInfo is extended with the field tpId which specifies the identity of a TP associated with a cell identified by a PCI (physCellId). The tpId field together with the physCellId and/or the prsID may be used to identify the TP when the same PCI is shared by multiple transmission points.

```
-- ASN1START
OTDOA-ReferenceCellInfo ::= SEQUENCE {
    physCellId         INTEGER (0..503),
    cellGlobalId       ECGI                      OPTIONAL,   -- Need ON
    earfcnRef          ARFCN-ValueEUTRA          OPTIONAL,   -- Cond
NotSameAsServ0
    antennaPortConfig  ENUMERATED {ports1-or-2, ports4, ... }
                                                 OPTIONAL,   -- Cond
NotSameAsServ1
    cpLength           ENUMERATED { normal, extended, ... },
    prsInfo            PRS-Info                  OPTIONAL,   -- Cond PRS
    ...,
    [[ earfcnRef-v9a0  ARFCN-ValueEUTRA-v9a0     OPTIONAL    -- Cond
NotSameAsServ2
    ]],
    [[ tpId-r14        INTEGER (0..4095)         OPTIONAL    -- Need OR
    ]]
}
-- ASN1STOP
```

The OTDOA Assistance Data Elements also comprises IE OTDOA-NeighbourCellInfoList used by the location server to provide neighbour cell information. The OTDOA-neighboringCellInfoElement is also extended with the tpId field as shown below:

```
-- ASN1START
OTDOA-NeighbourCellInfoList ::= SEQUENCE (SIZE (1..maxFreqLayers)) OF OTDOA-
NeighbourFreqInfo
OTDOA-NeighbourFreqInfo ::= SEQUENCE (SIZE (1..24)) OF OTDOA-NeighbourCellInfoElement
OTDOA-NeighbourCellInfoElement ::= SEQUENCE {
    physCellId              INTEGER (0..503),
    cellGlobalId            ECGI                    OPTIONAL,    -- Need ON
    earfcn                  ARFCN-ValueEUTRA        OPTIONAL,    -- Cond
NotSameAsRef0
    cpLength                ENUMERATED {normal, extended, ...}
                                                    OPTIONAL,    -- Cond
NotSameAsRef1
    prsInfo                 PRS-Info                OPTIONAL,    -- Cond
NotSameAsRef2
    antennaPortConfig       ENUMERATED {ports-1-or-2, ports-4, ...}
                                                    OPTIONAL,    -- Cond
NotsameAsRef3
    slotNumberOffset        INTEGER (0..19)         OPTIONAL,    -- Cond
NotSameAsRef4
    prs-SubframeOffset      INTEGER (0..1279)       OPTIONAL,    -- Cond
InterFreq
    expectedRSTD            INTEGER (0..16383),
    expectedRSTD-Uncertainty INTEGER (0..1023),
    ...,
    [[ earfcn-v9a0          ARFCN-ValueEUTRA-v9a0   OPTIONAL     -- Cond
NotSameAsRef5
    ]],
    [[ tpId-r14             INTEGER (0..4095)                    OPTIONAL    -- Need OR
    ]]
}
```

The current PRS design has a fixed frequency reuse factor of K=6 which is adequate, for example, when a UE is measuring RSTDs in a dense deployment. However, when considering sparsely deployed scenarios, or deep indoor scenarios such as MTC or Narrowband Internet of Things (NB-IoT) scenarios, where the UE is only capable of hearing a few number of cells, then the frequency reuse factor of K=6 results in an inefficient resource usage for PRS.

SUMMARY

An object of embodiments is to alleviate or at least reduce one or more of the above-mentioned problems, and to provide a solution allowing an adaptive frequency reuse factor for PRS. This object, and others, is achieved by methods and apparatus according to embodiments herein.

According to a first aspect, a method performed by a network node of a wireless communication network, for receiving an RSTD value from a wireless device is provided. The method comprises transmitting a configuration of positioning reference signals, PRSs, to the wireless device, the configuration indicating a plurality of PRS identities for respective TPs of the wireless communication network. The method also comprises receiving an RSTD value for a TP from the wireless device determined based on the configuration of PRSs.

According to a second aspect, a method performed by a wireless device for reporting a RSTD value to a network node of a wireless communication network is provided. The method comprises receiving a configuration of PRSs from the network node, the configuration indicating a plurality of PRS identities for respective TPs of the wireless communication network. The method also comprises determining an RSTD value for a TP based on the received configuration, and reporting the determined RSTD value for the TP to the network node.

According to a third aspect, a network node for a wireless communication network is provided. The network node is configured to receive a RSTD value from a wireless device. The network node is further configured to transmit a configuration of PRSs to the wireless device, the configuration indicating a plurality of PRS identities for respective TPs of the wireless communication network, and to receive an RSTD value for a TP from the wireless device determined based on the configuration of PRSs.

According to a fourth aspect, a wireless device configured to report a RSTD value to a network node of a wireless communication network is provided. The wireless device is further configured to receive a configuration of PRSs from the network node, the configuration indicating a plurality of PRS identities for respective TPs of the wireless communication network. The wireless device is also configured to determine an RSTD value for a TP based on the received configuration, and to report the determined RSTD value for the TP to the network node.

According to a fifth aspect, a network node for a wireless communication network is provided. The network node is configured to receive a RSTD value from a wireless device. The network node comprises a processing circuitry and a memory, the memory containing instructions executable by the processing circuitry whereby the network node is configured to transmit a configuration of PRSs to the wireless device, the configuration indicating a plurality of PRS identities for respective transmission points, TPs, of the wireless communication network, and receive an RSTD value for a TP from the wireless device determined based on the configuration of PRSs.

According to a sixth aspect, a wireless device configured to report a RSTD value to a network node of a wireless communication network is provided. The wireless device comprises a processing circuitry and a memory, the memory containing instructions executable by the processing circuitry whereby the wireless device is configured to receive a configuration of PRSs from the network node, the configuration indicating a plurality of PRS identities for respective TPs of the wireless communication network, determine an RSTD value for a TP based on the received configuration, and report the determined RSTD value for the TP to the network node.

According to further aspects, a computer program is provided comprising computer readable code which when executed by at least one processor of a network node causes the network node to carry out the method according to the first aspect, as well as a carrier containing the computer program.

According to further aspects, a computer program is provided comprising computer readable code which when executed by at least one processor of a wireless device causes the wireless device to carry out the method according to the second aspect, as well as a carrier containing the computer program.

One advantage of embodiments is that they allow a more efficient resource usage for PRS by providing a flexibility of the PRS frequency reuse.

Other objects, advantages, and features of embodiments will be explained in the following detailed description when considered in conjunction with the accompanying drawings and embodiments.

DETAILED DESCRIPTION

Figure 1:
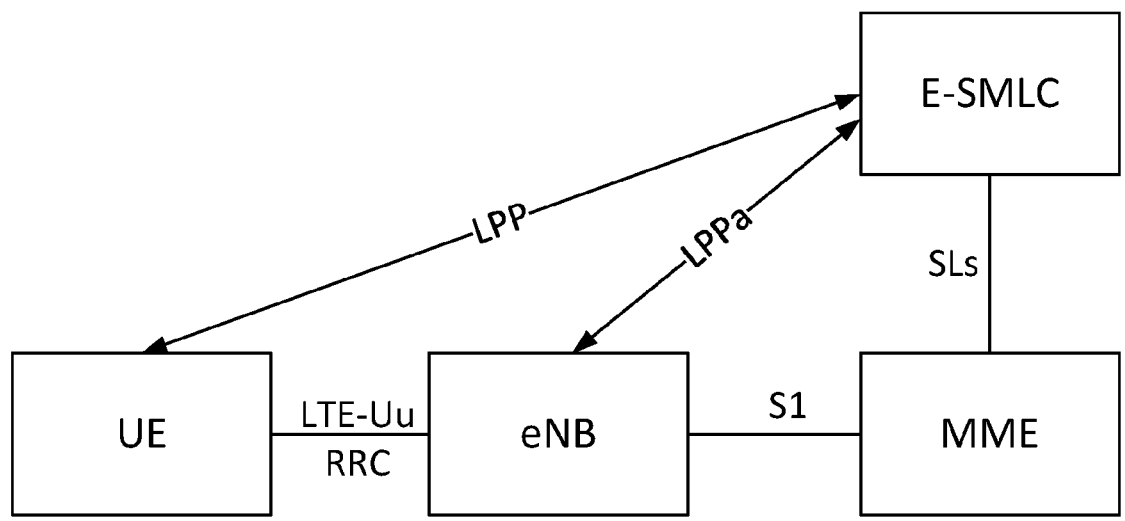
FIG. 1 schematically illustrates the positioning architecture in LTE.
Figure 2:
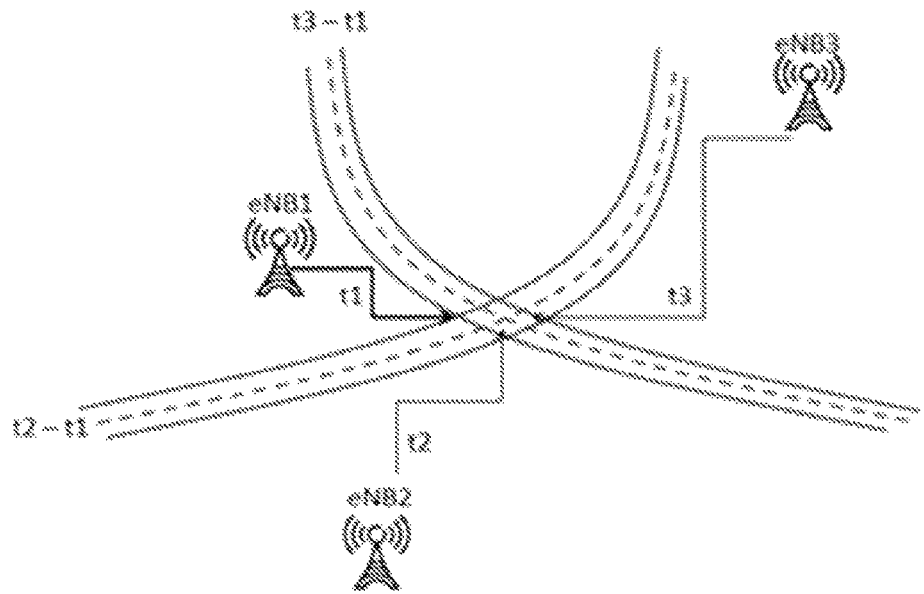
FIG. 2 schematically illustrates OTDOA position estimation based on multi-lateration of the RSTD measurements.
Figure 3A:
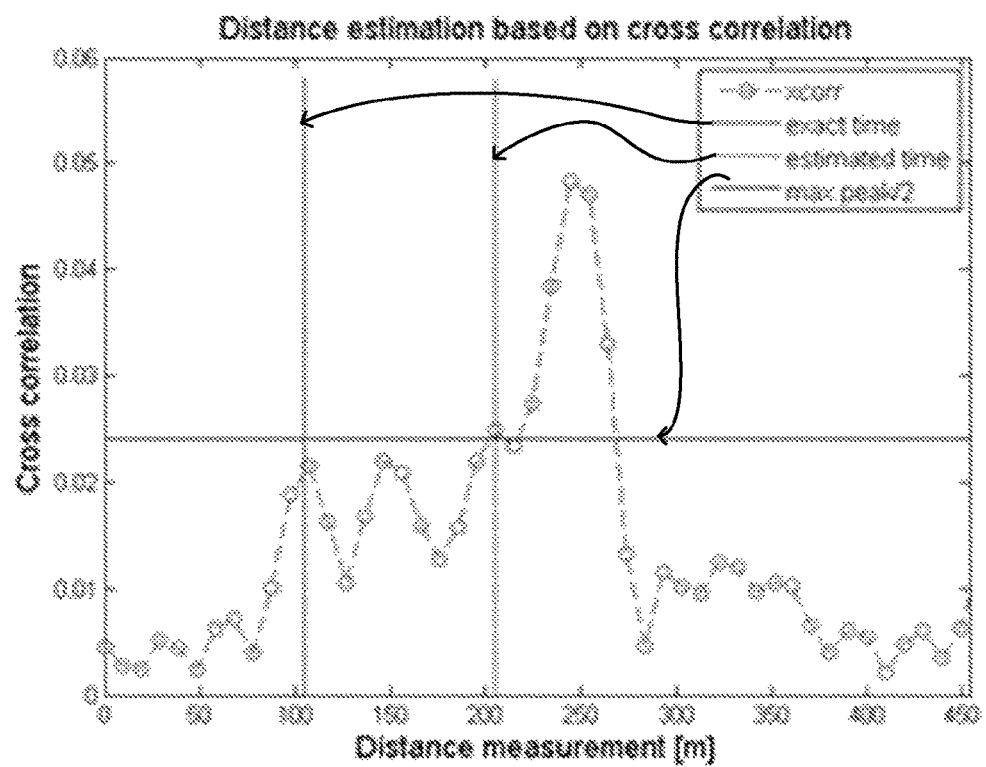
FIGS. 3a-b are graphs of cross correlation vs distance illustrating the importance of the threshold value used for the TOA estimation.
Figure 3B:
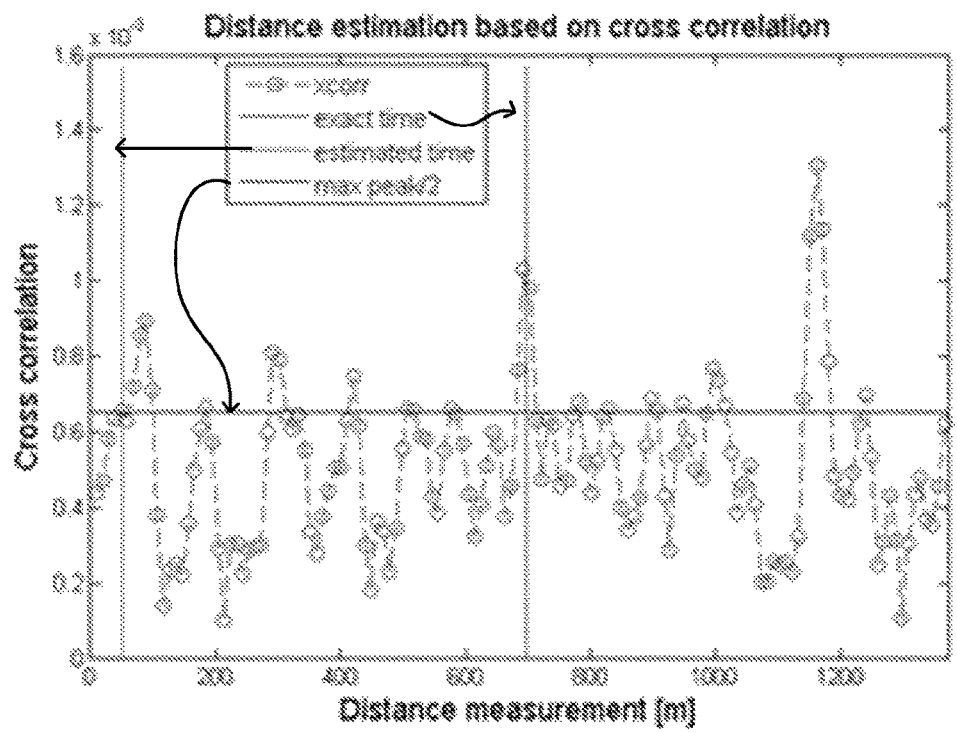
Figure 4A:
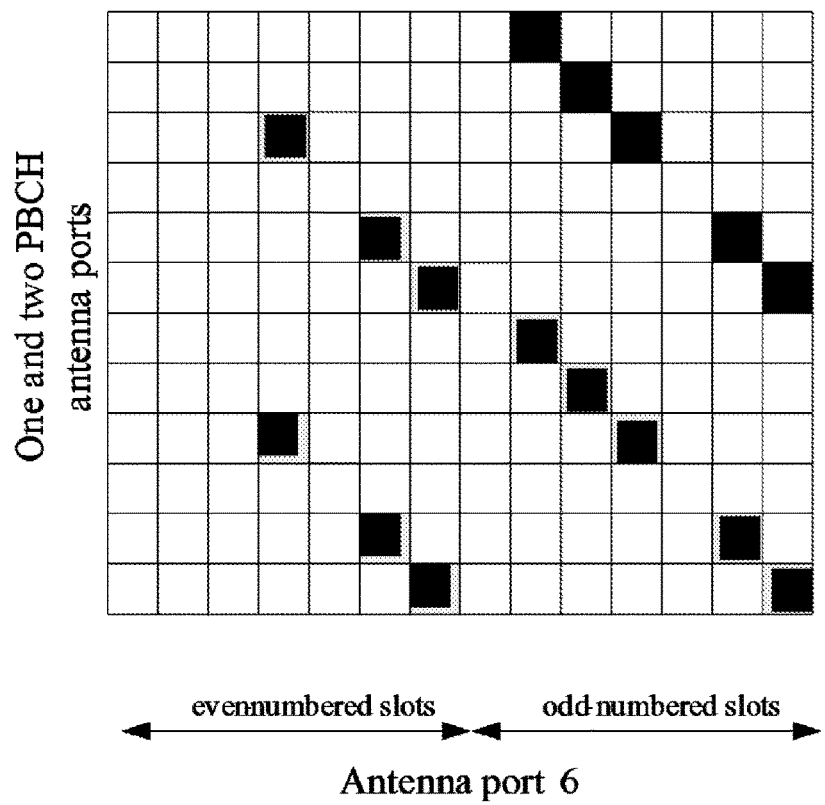
FIGS. 4a-b schematically illustrate a mapping of PRS for normal CP and extended CP respectively.
Figure 4A:
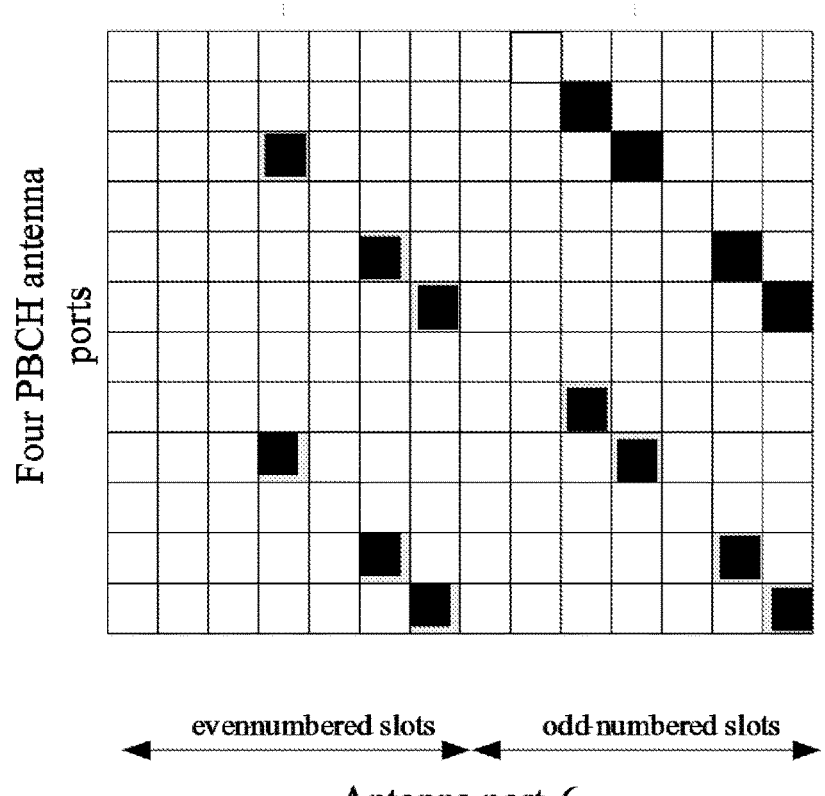
Figure 4B:
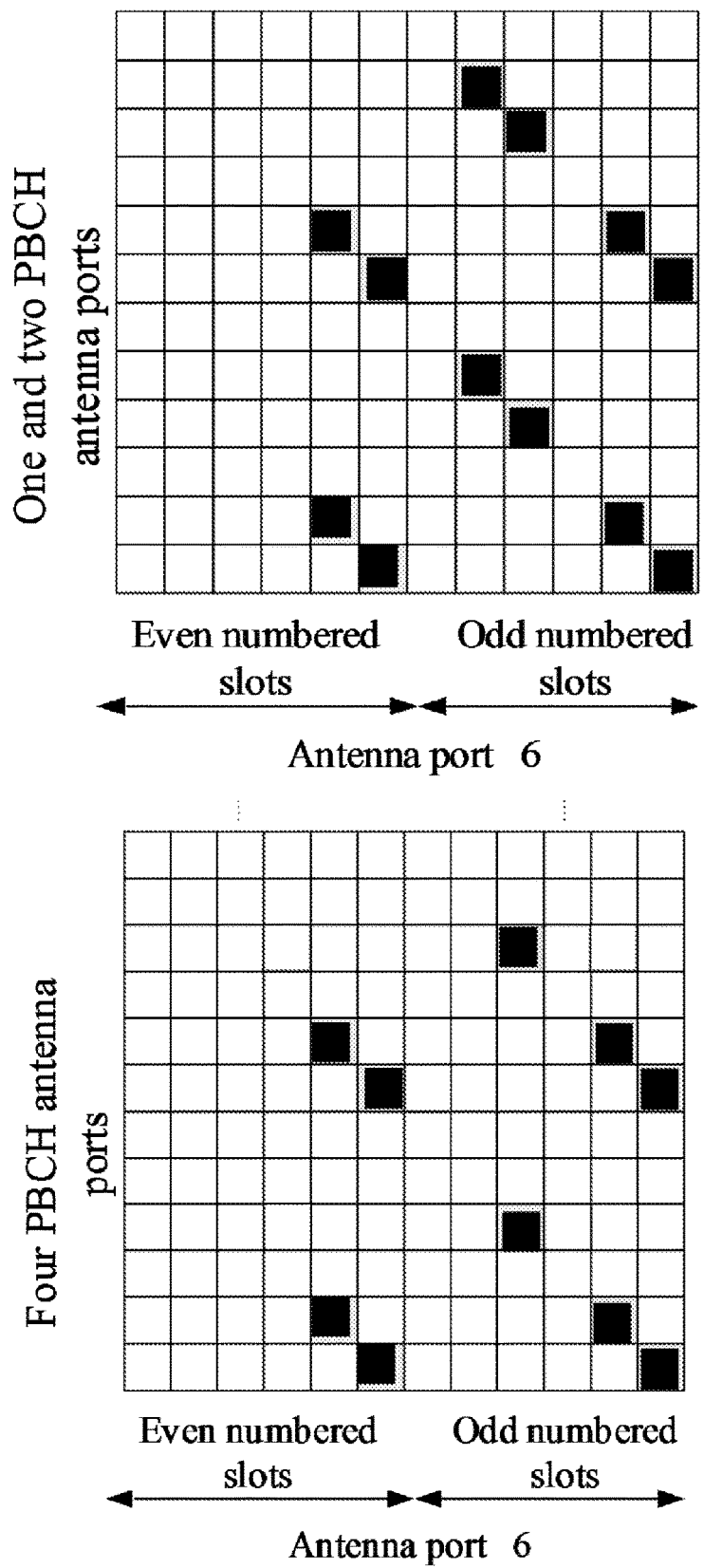

In the following, different aspects will be described in more detail with references to certain embodiments and to accompanying drawings. For purposes of explanation and not limitation, details are set forth, such as particular scenarios and techniques, in order to provide a thorough understanding of the different embodiments. However, other embodiments that depart from these details may also exist.

Furthermore, in some instances detailed descriptions of well-known methods, nodes, interfaces, circuits, and devices are omitted so as not obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, or ASICs. Likewise, some or all of the functions may be implemented using software programs and data in conjunction with one or more digital microprocessors or general-purpose computers. Where nodes that communicate using the air interface are described, it will be appreciated that those nodes also have suitable radio communications circuitry. Moreover, the technology may be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the present invention may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and where appropriate state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

As mentioned in the background section, the current PRS design has a fixed frequency reuse factor of K=6 which is adequate, for example, when a UE is measuring RSTDs in a dense deployment. However, when considering sparsely deployed scenarios with large distances between TPs, or deep indoor scenarios or situations where the UE is only capable of hearing a few number of cells, then the frequency reuse factor of K=6 results in an inefficient resource usage for PRS. This is illustrated by the two example deployment scenarios in FIGS. 5a and 5b. In the sparse deployment scenario illustrated in FIG. 5a, the UE is within coverage of only three TPs, and is thus able to calculate the RSTDs for those three TPs. A PRS frequency reuse factor K=6 will imply that only a subset of the available PRS resources are used, which results in an inefficient resource usage for the PRS thus limiting the positioning performance. The unused PRS resources are illustrated in the table in FIG. 5a where the resource allocation for each TP Identity (TP_ID) within a PRS resource block for one OFDM symbol is shown. A sparse deployment scenario is for example an indoor environment with only a few deployed nodes, or a deployment in a rural area.

Figure 5A:
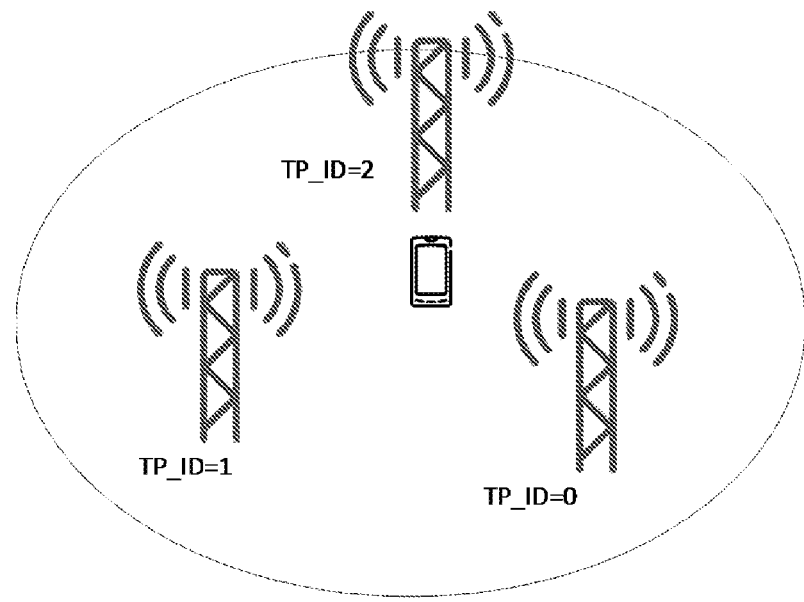
FIGS. 5a-b schematically illustrate a sparse and a dense deployment of TPs respectively, and the corresponding PRS resource allocation for each TP-ID in one PRS resource block according to prior art.
Figure 5B:
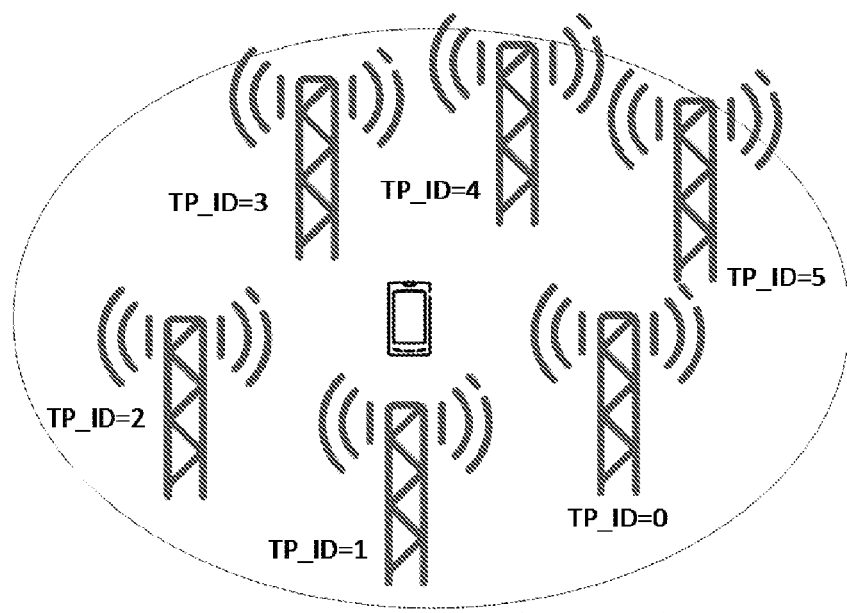

Another denser deployment scenario is illustrated in FIG. 5b. In this scenario, a PRS frequency reuse factor K=6 is probably adequate. It is assumed that the UE in this example scenario can detect multiple cells with good signal quality, which means that it can be beneficial with a frequency reuse factor K=6. The table in the figure shows the PRS resource allocation for each TP-ID in one PRS resource block.

Embodiments are described in a non-limiting general context in relation to an example scenario in a 3GPP LTE system, based on a positioning architecture as the one schematically illustrated in FIG. 1, and applying OTDOA positioning based on PRS TOA measurements as described in the background, where the default PRS frequency reuse factor K=6. However, embodiments of the invention may be applied to other wireless communication systems configured for positioning and using positioning reference signals for positioning measurements, and for other default PRS frequency reuse factors than K=6. One example of a wireless communication systems configured for positioning and using positioning reference signals for positioning measurements other than the 3GPP LTE system may be an NB-IoT system. The PRS used in NB-IoT is referred to as a Narrowband PRS (NPRS). NB-IoT use the same default NPRS frequency reuse factor of K=6.

Figure 6:
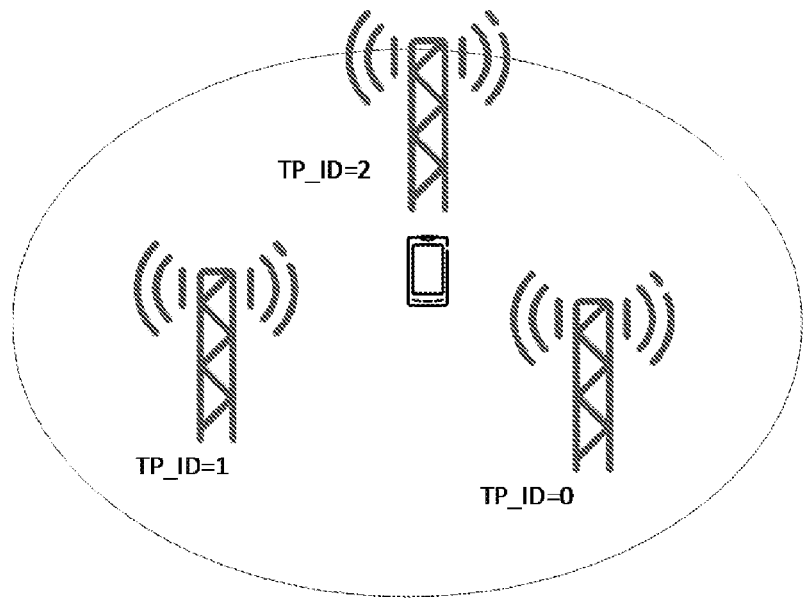
FIG. 6 schematically illustrate a sparse deployment of TPs and the corresponding PRS resource allocation according to embodiments of the invention.

As illustrated by the deployment scenarios in FIGS. 5a-b, the use of a fixed PRS frequency reuse factor in all deployment scenarios may be suboptimal with regards to the PRS resource usage. This problem is addressed by a solution in which the PRS frequency reuse factor may vary related to a default frequency reuse factor, so that e.g. all available PRS resources may be used in a scenario as the one illustrated in FIG. 5a. By providing a flexibility of changing the PRS frequency reuse, a better PRS utilization can be obtained in a sparse deployment and in certain indoor deployments. This is achieved by configuring multiple prsIDs for each TP. With more prsIDs for a TP, the number of PRS resources per TP increases, which may improve the SINR and thus the positioning accuracy. FIG. 6 illustrates a PRS resource allocation in a sparse deployment scenario according to embodiments of the invention. FIG. 6 shows how the number of PRS resources per TP is doubled in comparison with FIG. 5a, which means that the SINR level increases by 3 dB at the UE for the involved TPs. The doubling of the PRS per TP correspond to a frequency reuse factor reduction from 6 to 3, as the frequencies are reduced in every third cell. This does not cause any interference problem as the UE can't hear more than three cells anyway.

As will be further explained below, embodiments of the invention can be implemented by introducing new signaling elements in LPP, or by using the existing LPP signaling as described in the background section.

The solution uses the prsID introduced in Rel.14 (see above). PRSs are thus generated based on multiple prsIDs for one TP and transmitted to the UE. This provides a possibility to change the frequency reuse and exploit more PRS resource to increase the SINR and hence positioning accuracy in deployment scenarios where few cells are hearable to the UE.

When a UE receives several PRS's from a TP which is generated using multiple prsIDs, the UE combines the estimated channel for each individual PRS. This may be implemented through the cross-correlation procedure described previously. Parts of the procedure are repeated hereinafter. The cross-correlation function giving the channel impulse response is the following:

$$R_k[\tau] = \sum_{i=0}^{K} y[i]x_y^*[i-\tau]$$

The known transmitted signal $x_k$ corresponds to the k:th transmitted individual PRS generated by a single prsID for one TP. The cross-correlation function (or channel) is therefore calculated or derived for each individual PRS received at the UE. In order to combine the cross-correlation for an improved time estimation, the UE may perform a coherent combining as described hereinafter by summing the cross-correlations:

$$R_{final}[\tau] = \sum_{k}^{N_{(prs-ID)}} R_k[\tau]$$

where $N_{(prs-ID)}$ is the number of prsIDs as well as the number of individual PRS transmitted from the intended TP. The combination of the cross-correlations will reduce the noise power in $R_{final}$. This will improve the Signal to Noise Ratio (SNR) at the UE and increase the TOA estimation accuracy.

In another embodiment, the UE can combine the cross-correlation non-coherently by summing the absolute values of the cross-correlation:

$$R_{final}[\tau] = \sum_{k}^{N_{(prs-ID)}} |R_k[\tau]|$$

Non-coherent combining can for example be beneficial if different precoders are used for each individual PRS.

The cross-correlation procedure described above is a non-limiting example of a low-complexity implementation. However, there are many alternative procedures for how to calculate $R_{final}$, such as using a weighted average of $R_k$, or a sum squared combination of $R_k$. Furthermore, the UE method for processing the transmitted signal $x_k$ is not limited to the time-based procedure described above, but may instead be performed by frequency-domain processing for example.

$R_{final}[\tau]$ is used to calculate the TOA, as described in the background section. Based on the set of estimated TOAs, the RSTDs can be formed, and the location of the UE can be estimated.

Example Embodiment of a Method in a Location Server and a UE

The following describes some details of an example embodiment of a method performed in a location server and in a UE of an LTE system. The location server may be an E-SMLC. The UE may be served by a cell controlled by an eNodeB which is a master node for a number of TPs or eNodeBs serving one cell each. The information transmitted between the location server and the UE is transmitted over the wireless link to the UE with the help from the TP/eNodeB of the UE's serving cell.

A: The location server may optionally receive a capability indication from the UE (via the UEs serving TP or eNodeB) indicating whether or not the UE can support multiple prsIDs, i.e. both receive them and process them. The capability indication is used by the location server to determine whether a frequency reuse factor other than the default frequency reuse factor may be selected for the PRS configuration of this UE, as described hereinafter. If the UE lacks the capability to handle multiple PRS-IDs and thereby multiple PRS for one TP when estimating TOA, it is no use to adapt the frequency reuse factor for a better PRS utilization. However, if the location server gets an indication that the UE has the capability to handle multiple PRS-IDs and thereby multiple PRS for one TP when estimating TOA, the frequency reuse factor may be adapted as described below.

B: The frequency reuse factor to use may be determined or selected dependent on the scenario, and is a trade-off between hearability and robustness to interference. Typically, in a sparse deployment scenario a lower frequency reuse factor should be used in order to increase the hearability for each TP. This would increase the interference for TPs transmitting in the same time-frequency resources. However, if the TPs are largely separated in a sparse deployment, any interference from TPs with same time-frequency allocation may be neglectable.

It may be the location server that determines or selects the frequency reuse factor. In another alternative, it may be another network node, such as an Operation and Maintenance node, that determines the frequency reuse factor and forwards it to the location server or to the eNodeB. The selection of the frequency reuse factor may be based on one or more of the following properties:

TP deployment information: When the TPs are largely separated in terms of geographical distance, it corresponds to a sparse deployment scenario such as the one illustrated in FIG. 6, and thus more PRS resources per TP are beneficial corresponding to a lower frequency reuse factor than the default frequency reuse factor.

TP type information: In case of low bandwidth or/and low TP transmission power and/or high carrier frequency and/or limited antenna gain, the hearability decreases. In this case, it may be beneficial to use more PRS resources per TP.

Historical information: For some deployments, it may be noted that only a few RSTDs are reported from the UE. This may indicate that the location server should change the TP frequency reuse in order to increase the hearability for those few cells. As another option, historical information about whether a previous configuration with multiple prsIDs was advantageous or not may be used to determine whether such a configuration should be used or not. This may be implemented through an optional UE report that comprises whether or not a frequency reuse factor other than default was required, or in other words, if multiple prsIDs was required for a better positioning performance.

UE capability: Based on the UE capability report from the UE (as described above), the location server may select the frequency reuse factor for each TP, for example, based on how many UEs that has the capability of receiving multiple prsIDs. In another example embodiment, the selection may be based on the coverage class of the UEs participating in the positioning procedure. For example, if a large portion of the UEs are low-cost machine-type-communication (MTC) devices, the location server may select a lower frequency reuse factor since the MTC devices are often deployed in bad coverage regions and can only hear a limited number of cells.

C: After obtaining, determining, or selecting the frequency reuse factor, the location server selects or determines the prsIDs based on the frequency reuse factor. The frequency shift may be determined using $v_{shift}=N_{ID}^{PRS} \bmod 6$. When selecting a frequency reuse factor of for example K=3, the set of chosen prsIDs needs to be selected wisely in order to ensure that none of the chosen prsIDs has the same frequency shift, since that would imply that two individual PRS in the group of TPs use the same time-frequency resources. For example, if a TP should be assigned with two prsIDs (corresponding to a frequency reuse factor of 3), and the first prsID is 0, the second prsID should not be any of the following set of prsIDs {0,6,12,18,24, . . . etc.}. When using $v_{shift}=N_{ID}^{PRS} \bmod 6$ for determining the frequency shift, this implies that one could assign up to six different prsIDs per TP, and still ensure time-frequency orthogonality of the corresponding PRSs.

Also, the prsID should be chosen in a way that ensures that the interference towards other TPs is minimized. For example, two TPs should be sufficiently geographically separated if selecting same prsID, or the same frequency shift. In the latter case, with two different prsIDs, but the same frequency shift, the interference between the two individual PRSs is suppressed by the processing gain of the PRS sequence, and the individual PRSs can be reused geographically closer compared to the same prsID.

D: The UE may then receive a PRS configuration from the location server comprising multiple prsIDs. The signaling of the multiple prsIDs in the PRS configuration may be performed using for example LPP. Support for multiple prsID may be achieved using the existing LPP specification. Since the OTDOA-NeighbourCellInfoElement is a sequence of elements containing PRS info, one could use two or more elements with a same TP-ID but with different prsIDs in the PRS-Info element. For example, assuming that a neighboring TP with TP-ID 0 should be assigned with prsIDs={0,1}, one element in the OTDOA-NeighbourCellInfoElement (see below) may comprise tpID-r14=0, prs-iD-r14=0 in the prsInfo element, and another element in OTDOA-NeighbourCellInfoElement may comprise tpID-r14=0, prs-iD-r14=1 in the prsInfo element. This embodiment could be easily implemented using the existing LPP protocol.

```
OTDOA-NeighbourCellInfoElement ::= SEQUENCE {
...
    prsInfo        PRS-Info          OPTIONAL,    -- Cond
...
    [[ tpId-r14    INTEGER (0..4095) OPTIONAL     -- Need OR
    ]]
{
```

In another embodiment, multiple prsIDs may be included in the prsInfo element as illustrated in the signaling specification below. The prsID-r14 is thus amended or extended to support a list of prsIDs. This embodiment would make the multiple prsID report more efficient than the previous embodiment, as the signaling would be more compact with less signaling overhead.

```
PRS-Info ::= SEQUENCE {
    prs-Bandwidth         ENUMERATED { n6, n15, n25, n50, n75, n100, ... },
    prs-ConfigurationIndex INTEGER (0..4095) ,
    numDL-Frames          ENUMERATED {sf-1, sf-2, sf-4, sf-6, ...},
```

```
...,
    prs-MutingInfo-r9          CHOICE {
        po2-r9                     BIT STRING (SIZE(2)),
        po4-r9                     BIT STRING (SIZE(4)),
        po8-r9                     BIT STRING (SIZE(8)),
        po16-r9                    BIT STRING (SIZE(16)),
        ...
    }                                                      OPTIONAL   -- Need OP
    [[ prsID                   INTEGER (0..4095)  OPTIONAL   -- Need ON
    ]],
    [[ extraPrsIDList-r14      ExtraPrsIDList-r14  OPTIONAL   -- Need ON
    ]],
}
ExtraPrsIDList-r14 ::= SEQUENCE (SIZE (1..maxExtraPRS)) OF INTEGER (0..4095)
```

In embodiments, the location server thus transmits a multiple prsID information element to the UE in the PRS configuration. The eNodeB subsequently generates PRS according to the PRS configuration. The multiple prsID information element may optionally comprise an indication that the location server intends to send multiple prsIDs per TP. This could save processing overhead at the UE since the UE may avoid searching for matches of TP-IDs when no multiple-prsIDs are configured. In another embodiment, information signaled to the UE may comprise information indicating what procedure to use when estimating the channel or more generally when determining the RSTD values. The information signaled to the UE may e.g. comprise information indicating whether the UE should do coherent or non-coherent combining based on the individual PRS. For example, in case the TP uses different precoders for the one or more individual PRS, the UE should preferably combine the estimated channel for each individual PRS non-coherently.

E: The UE may detect that two OTDOA-NeighbourCellInfoElement elements include the same TP-ID. When receiving the PRSs according to the PRS configuration, the UE may then derive the combined channel based on the estimated cannels for each individual PRS (one PRS based on prsID-r14=0, and another based on prsID-r14=1). The combined channel is then used for estimating the RSTD for TP 0. So, for each TP, the UE estimates a TOA based on the estimated R_final described above, and then forms the RSTDs. The UE thus measures the RSTD based on the received PRS configuration.

F: The UE reports the RSTD values via the LPP signaling to the location server. The location server thus receives a report comprising the RSTD measurement results or the RSTD values from the UE. The report optionally comprises whether or not a frequency reuse other than the default was required, i.e. whether multiple prsIDs was required, for determining the RSTD. For example when estimating or calculating $R_{final}$, i.e. the sum of the cross-correlations, the UE may only include a subset of the estimated cross correlations $R_k[\tau]$ in the sum.

The UE may thus assess whether or not the same RSTD accuracy could be provided by processing only one of the individual PRS instead of all or a subset of them. In one embodiment, the number of individual PRS needed to achieve an accurate RSTD may be signaled by the UE to the location server. Furthermore, information of what prsIDs that are used for determining the RSTD values may be signaled. This kind of information may be used in order to determine what frequency reuse factor to use in the future, as described above. For example, if a frequency reuse factor of K=3 is used, while a majority of UEs report that a reuse factor of K=6 is providing a similar accuracy, this would indicate that no change of the frequency reuse factor is needed. An optimal frequency reuse factor may thus be determined and may lead to better positioning accuracy for future positioning requests.

Embodiments of Methods Described with Reference to FIGS. 7-8

Figure 7:
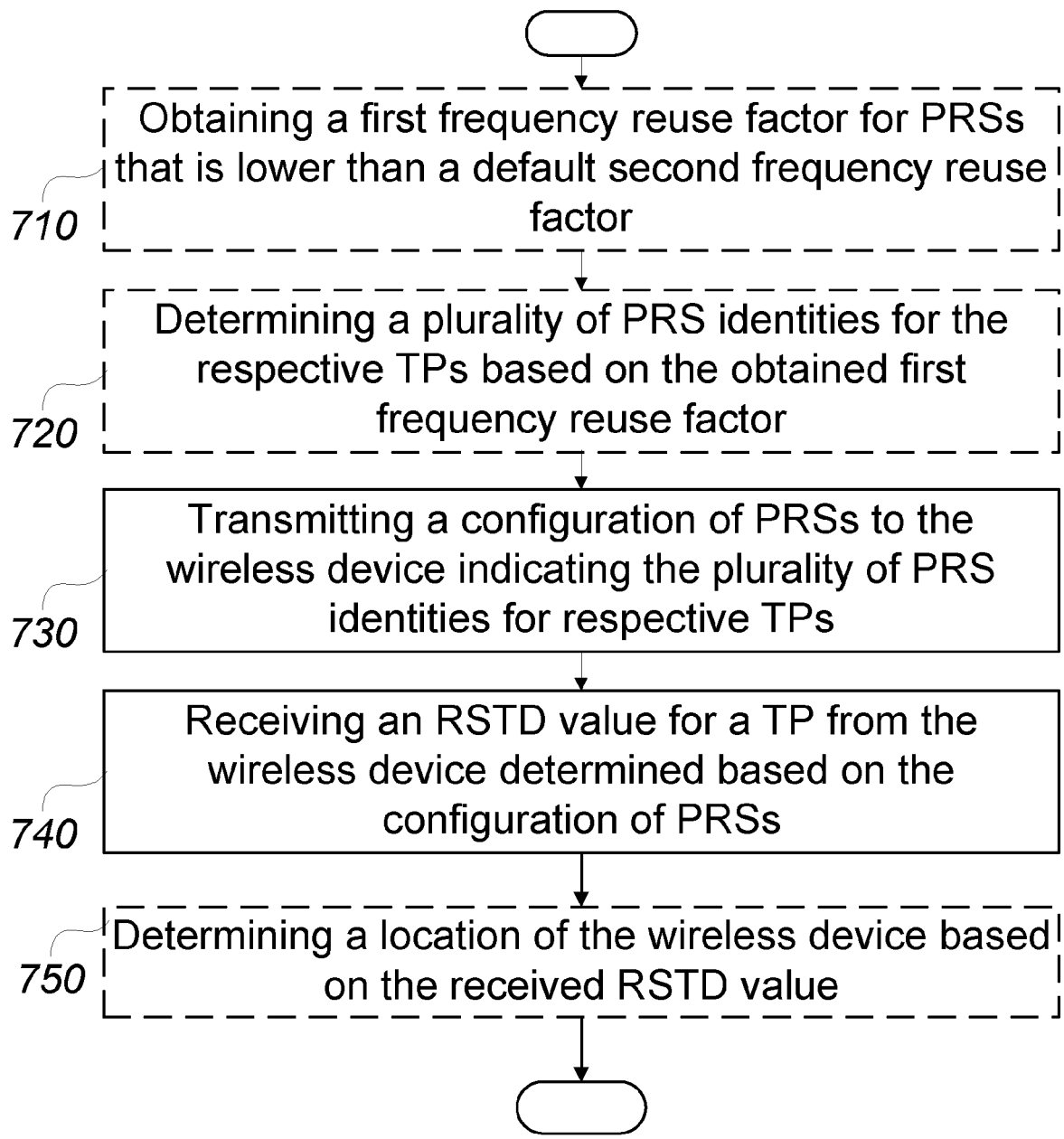
FIG. 7 is a flow chart schematically illustrating embodiments of the method performed by a network node according to various embodiments.

FIG. 7 is a flowchart illustrating one embodiment of a method performed by a network node of a wireless communication network, for receiving a reference signal time difference, RSTD, value from a wireless device. The network node may be a location server, such as an E-SMLC, or an eNodeB or TP of an LTE network, and the wireless device may be a UE. The method steps that are within boxes with dashed lines are optional steps. These optional steps may not always be performed or may in some embodiments be performed by another network node. The method may comprise:

710: Obtaining a first frequency reuse factor for PRSs that is lower than a default second frequency reuse factor. Obtaining the first frequency reuse factor may comprise receiving the frequency reuse factor from another network node. The location server may e.g. receive it from an Operation and Maintenance node. Obtaining the first frequency reuse factor may alternatively comprise determining the frequency reuse factor based on at least one of: a geographic deployment of the TPs; radio characteristics of the TPs; historical information related to RSTD reports from the wireless device for the respective TPs; a capability of handling the plurality of PRS identities associated with the wireless device (see section A above for details); a coverage class of the wireless device. This step is further exemplified in the above section "Example embodiment of a method in a location server and a UE", under section B.

720: Determining the plurality of PRS identities for the respective TPs based on the obtained first frequency reuse factor, wherein the determined plurality of PRS identities are indicated in the transmitted configuration in 730; Determining the plurality of PRS identities may comprise selecting the plurality of PRS identities such that PRSs generated using the plurality of PRS identities are time-frequency orthogonal. This step is further exemplified in the above section "Example embodiment of a method in a location server and a UE", under section C.

730: Transmitting a configuration of positioning reference signals, PRSs, to the wireless device, the configuration indicating a plurality of PRS identities for respective transmission points, TPs, of the wireless communication network. There may in embodiments be a further step in the method taking place before transmitting the configuration of PRSs, which is transmitting information to the wireless device informing that the configuration will indicate a plurality of PRS identities for respective TPs. This may alternatively be done together or simultaneously with the transmission of the configuration. This step is further exemplified in the above section "Example embodiment of a method in a location server and a UE", under section D.

740: Receiving an RSTD value for a TP from the wireless device determined based on the configuration of PRSs. This step is further exemplified in the above section "Example embodiment of a method in a location server and a UE", under section F.

750: Determining a location of the wireless device based on the received RSTD value.

The method may further comprise transmitting to the wireless device an indication of a procedure to use for determining the RSTD value. In embodiments, the method may further comprise receiving information from the wireless device indicating whether all or a subset of PRSs generated using the plurality of PRS identities for the TP was used for determining the received RSTD value, as indicated in the above section "Example embodiment of a method in a location server and a UE", under section F.

In other embodiments, the network node may be an eNodeB, or a base station controlling the TP for which the RSTD value is received, that performs the steps 730 and 740 described above. The method may further comprise scheduling the TP to transmit PRSs to the wireless device, where the PRSs are generated using the plurality of PRS identities for the TP in accordance with the transmitted configuration.

Figure 8:
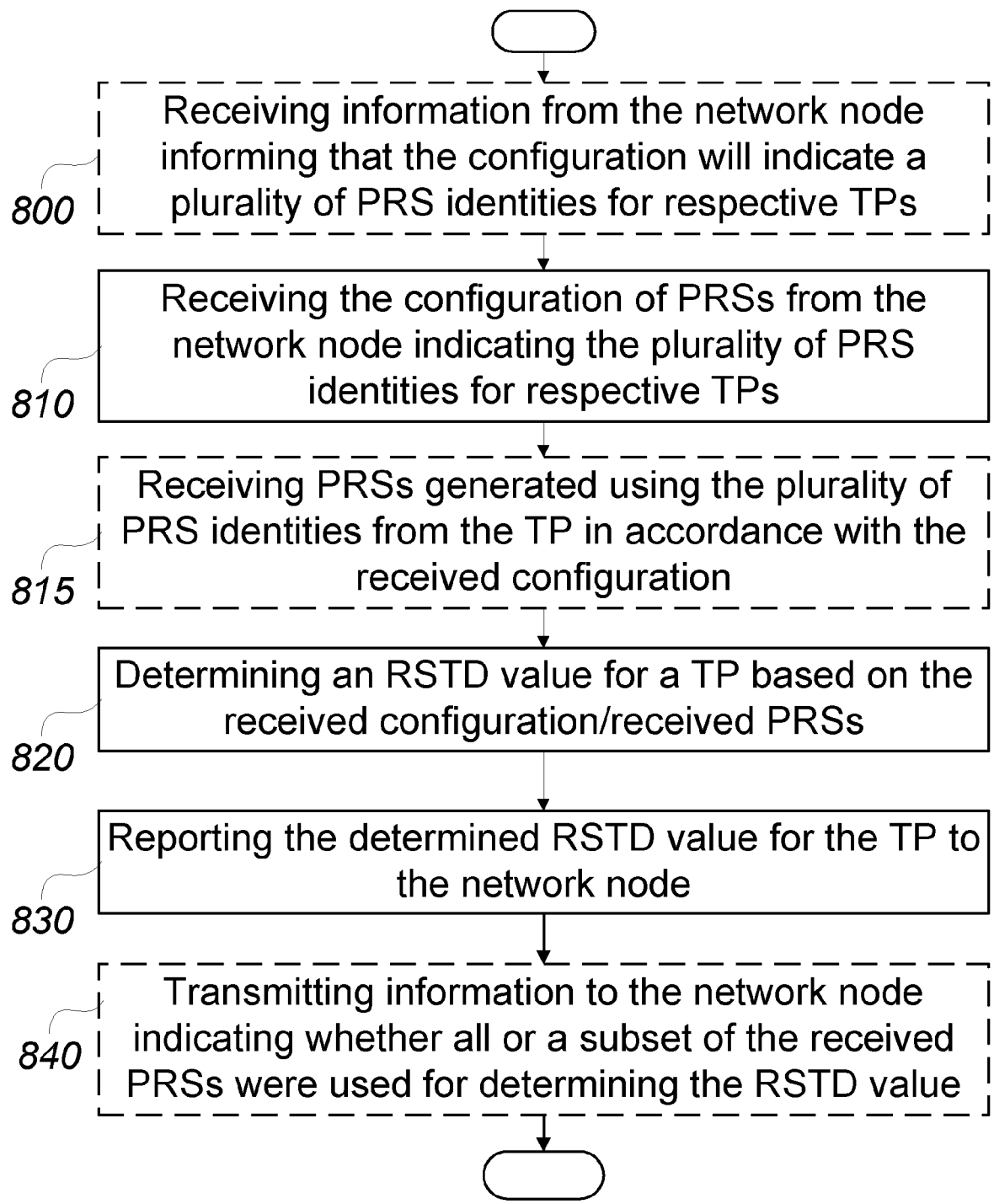
FIG. 8 is a flow chart schematically illustrating embodiments of the method performed by a wireless device according to various embodiments.

FIG. 8 is a flowchart illustrating one embodiment of a method performed by a wireless device for reporting a reference signal time difference, RSTD, value to a network node of a wireless communication network. The network node may be a location server, such as an E-SMLC, or an eNodeB or TP of an LTE network, and the wireless device may be a UE. The method steps that are within boxes with dashed lines are optional steps. These optional steps may not always be performed. The method may comprise:

800: Receiving information from the network node informing that the configuration will indicate a plurality of PRS identities for respective TPs, wherein the information is used for receiving the configuration in 810. This step is further exemplified in the above section "Example embodiment of a method in a location server and a UE", under section D.

810: Receiving a configuration of positioning reference signals, PRSs, from the network node, the configuration indicating a plurality of PRS identities for respective transmission points, TPs, of the wireless communication network. This step is further exemplified in the above section "Example embodiment of a method in a location server and a UE", under section D.

815: Receiving PRSs generated using the plurality of PRS identities from the TP in accordance with the received configuration, wherein the RSTD value for the TP is determined based on the received PRSs in 820.

820: Determining an RSTD value for a TP based on the received configuration. The RSTD value for the TP may be determined using all or a subset of the received PRSs. Determining the RSTD value for the TP may comprise combining channel estimates for all or a subset of the received PRSs and determining the RSTD value based on the combined channel estimates.

830: Reporting the determined RSTD value for the TP to the network node. This step is further exemplified in the above section "Example embodiment of a method in a location server and a UE", under section F.

840: Transmitting information to the network node indicating whether all or a subset of the received PRSs were used for determining the RSTD value. This step is further exemplified in the above section "Example embodiment of a method in a location server and a UE", under section F.

The method may further comprise receiving an indication of a procedure to use for determining the RSTD value. The method may further comprise transmitting information to the network node indicating a capability to handle a plurality of PRS identities for one TP.

Embodiments of Apparatus Described with Reference to FIGS. 9-10

Figure 9:
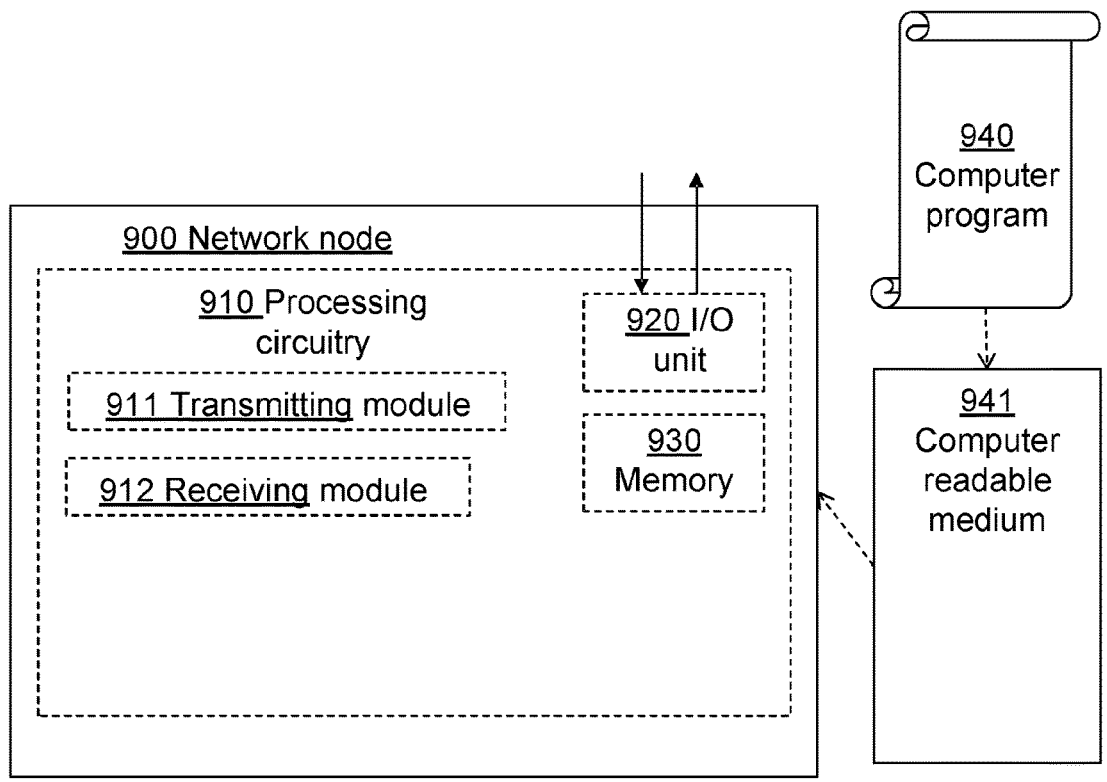
FIG. 9 is a block diagram schematically illustrating various embodiments of the network node.

An embodiment of the network node 900 for a wireless communication network, configured to receive a reference signal time difference, RSTD, value from a wireless device is schematically illustrated in the block diagram in FIG. 9. The network node is further configured to transmit a configuration of positioning reference signals, PRSs, to the wireless device, the configuration indicating a plurality of PRS identities for respective transmission points, TPs, of the wireless communication network, and receive an RSTD value for a TP from the wireless device determined based on the configuration of PRSs.

The network node may be further configured to determine a location of the wireless device based on the received RSTD value.

The network node may be further configured to obtain a first frequency reuse factor for PRSs that is lower than a default second frequency reuse factor, and determine the plurality of PRS identities for the respective TPs based on the obtained first frequency reuse factor, wherein the determined plurality of PRS identities are indicated in the transmitted configuration.

The network node may be configured to determine the plurality of PRS identities by being configured to select the plurality of PRS identities such that PRSs generated using the plurality of PRS identities are time-frequency orthogonal.

The network node may be configured to obtain the first frequency reuse factor by being configured to receive the frequency reuse factor from another network node.

The network node may be configured to obtain the first frequency reuse factor by being configured to determine the frequency reuse factor based on at least one of: a geographic deployment of the TPs; radio characteristics of the TPs; historical information related to RSTD reports from the wireless device for the respective TPs; a capability of handling the plurality of PRS identities associated with the wireless device; a coverage class of the wireless device.

The network node may be a base station configured to control the TP for which the RSTD value is received, which may be further configured to schedule the TP to transmit PRSs to the wireless device, where the PRSs are generated using the plurality of PRS identities for the TP in accordance with the transmitted configuration.

The network node may be further configured to transmit information to the wireless device informing that the configuration will indicate a plurality of PRS identities for respective TPs, before transmitting the configuration of PRSs.

The network node may be further configured to transmit to the wireless device an indication of a procedure to use for determining the RSTD value.

The network node may be further configured to receive information from the wireless device indicating whether all or a subset of PRSs generated using the plurality of PRS identities for the TP was used for determining the received RSTD value.

As illustrated in FIG. 9, the network node 900 may comprise at least one processing circuitry 910 and optionally also a memory 930. In embodiments, the memory 930 may be placed in some other node or unit or at least separately from the network node. The network node may also comprise one or more input/output (I/O) units 920 configured to communicate with a wireless device or another network node. The input/output (I/O) unit 920 may in embodiments comprise a transceiver connected to one or more antennas over antenna ports for wireless communication with wireless devices in the network, and/or an interface circuitry adapted for communication with other network nodes over various interfaces. The memory 930 may contain instructions executable by said at least one processing circuitry 910, whereby the network node may be configured to transmit a configuration of positioning reference signals, PRSs, to the wireless device, the configuration indicating a plurality of PRS identities for respective transmission points, TPs, of the wireless communication network, and receive an RSTD value for a TP from the wireless device determined based on the configuration of PRSs.

In embodiments, the memory 930 contains instructions executable by the processing circuitry 910 whereby the network node is configured to perform any of the methods previously described herein with reference to FIG. 7.

In an another embodiment also illustrated in FIG. 9, the network node may comprise a transmitting module 911, and a receiving module 912, adapted to respectively transmit a configuration of positioning reference signals, PRSs, to the wireless device, the configuration indicating a plurality of PRS identities for respective transmission points, TPs, of the wireless communication network, and receive an RSTD value for a TP from the wireless device determined based on the configuration of PRSs.

The network node may contain further modules adapted to perform any of the methods previously described herein.

The modules described above are functional units which may be implemented in hardware, software, firmware or any combination thereof. In one embodiment, the modules are implemented as a computer program running on the at least one processing circuitry 910.

In still another alternative way to describe the embodiment in FIG. 9, the network node may comprise a Central Processing Unit (CPU) which may be a single unit or a plurality of units. Furthermore, the network node may comprise at least one computer program product (CPP) with a computer readable medium 941, e.g. in the form of a non-volatile memory, e.g. an EEPROM (Electrically Erasable Programmable Read-Only Memory), a flash memory or a disk drive. The CPP may comprise a computer program 940 stored on the computer readable medium 941, which comprises code means which when run on the CPU of the network node causes the network node to perform the methods described earlier in conjunction with FIG. 7. In other words, when said code means are run on the CPU, they correspond to the at least one processing circuitry 910 of the network node in FIG. 9.

Figure 10:
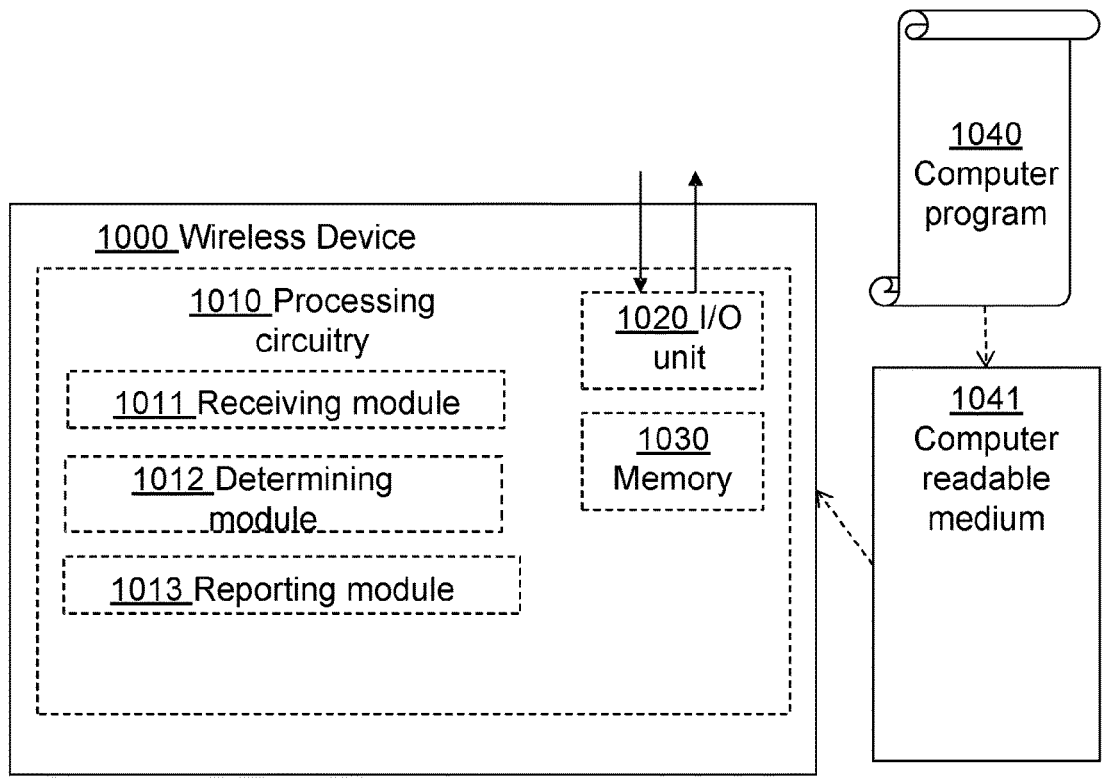
FIG. 10 is a block diagram schematically illustrating various embodiments of the wireless device.

An embodiment of the wireless device 1000 is schematically illustrated in the block diagram in FIG. 10. The wireless device 1000 is configured to report a reference signal time difference, RSTD, value to a network node of a wireless communication network, the wireless device being further configured to receive a configuration of positioning reference signals, PRSs, from the network node, the configuration indicating a plurality of PRS identities for respective transmission points, TPs, of the wireless communication network, determine an RSTD value for a TP based on the received configuration, and report the determined RSTD value for the TP to the network node.

The wireless device may be further configured to receive PRSs generated using the plurality of PRS identities from the TP in accordance with the received configuration, wherein the RSTD value for the TP is determined based on the received PRSs.

The wireless device may be further configured to determine the RSTD value for the TP using all or a subset of the received PRSs.

The wireless device may be further configured to determine the RSTD value for the TP by being configured to combine channel estimates for all or a subset of the received PRSs and determine the RSTD value based on the combined channel estimates.

The wireless device may be further configured to transmit information to the network node indicating whether all or a subset of the received PRSs were used for determining the RSTD value.

The wireless device may be further configured to receive information from the network node informing that the configuration will indicate a plurality of PRS identities for respective TPs, and to use the information for receiving the configuration.

The wireless device may be further configured to receive an indication of a procedure to use for determining the RSTD value.

The wireless device may be further configured to transmit information to the network node indicating a capability to handle a plurality of PRS identities for one TP.

As illustrated in FIG. 10, the wireless device 1000 may comprise at least one processing circuitry 1010 and optionally also a memory 1030. In embodiments, the memory 1030 may be placed in some other node or unit or at least separately from the wireless device 1000. The wireless device 1000 may also comprise one or more input/output (I/O) units 1020 configured to communicate with a network node such as an eNodeB. The input/output (I/O) unit 1020 may in embodiments comprise a transceiver connected to one or more antennas over antenna ports for wireless communication with network nodes in the network. The memory 1030 may contain instructions executable by said at least one processing circuitry 1010, whereby the wireless device 1000 may be configured to receive a configuration of positioning reference signals, PRSs, from the network node, the configuration indicating a plurality of PRS identities for respective transmission points, TPs, of the wireless communication network, determine an RSTD value for a TP based on the received configuration, and report the determined RSTD value for the TP to the network node.

In embodiments, the memory 1030 contains instructions executable by the processing circuitry 1010 whereby the wireless device is configured to perform any of the methods previously described herein with reference to FIG. 8.

In an another embodiment also illustrated in FIG. 10, the wireless device 1000 may comprise a receiving module 1011, a determining module 1012, and a reporting module 1013, adapted to respectively receive a configuration of positioning reference signals, PRSs, from the network node, the configuration indicating a plurality of PRS identities for respective transmission points, TPs, of the wireless communication network, determine an RSTD value for a TP based on the received configuration, and report the determined RSTD value for the TP to the network node.

The wireless device 1000 may contain further modules adapted to perform any of the methods previously described herein.

The modules described above are functional units which may be implemented in hardware, software, firmware or any combination thereof. In one embodiment, the modules are implemented as a computer program running on the at least one processing circuitry 1010.

In still another alternative way to describe the embodiment in FIG. 10, the wireless device 1000 may comprise a Central Processing Unit (CPU) which may be a single unit or a plurality of units. Furthermore, the wireless device 1000 may comprise at least one computer program product (CPP) with a computer readable medium 1041, e.g. in the form of a non-volatile memory, e.g. an EEPROM (Electrically Erasable Programmable Read-Only Memory), a flash memory or a disk drive. The CPP may comprise a computer program 1040 stored on the computer readable medium 1041, which comprises code means which when run on the CPU of the wireless device 1000 causes the wireless device 1000 to perform the methods described earlier in conjunction with FIG. 8. In other words, when said code means are run on the CPU, they correspond to the at least one processing circuitry 1010 of the wireless device 1000 in FIG. 10.

The above mentioned and described embodiments are only given as examples and should not be limiting. Other solutions, uses, objectives, and functions within the scope of the accompanying patent embodiments may be possible.

The invention claimed is:

1. A method, performed by a network node of a wireless communication network, for receiving a reference signal time difference (RSTD) value from a wireless device, the method comprising:
    obtaining a first frequency reuse factor for positioning reference signals (PRSs) that is lower than a default second frequency reuse factor;
    transmitting a configuration of PRSs to the wireless device, the configuration indicating a plurality of PRS identities for respective transmission points (TPs) of the wireless communication network;
    receiving an RSTD value for a TP from the wireless device determined based on the configuration of PRSs; and
    determining the plurality of PRS identities for the respective TPs based on the obtained first frequency reuse factor, wherein the determined plurality of PRS identities are indicated in the transmitted configuration.

2. The method of claim 1, further comprising determining a location of the wireless device based on the received RSTD value.

3. The method of claim 1, wherein the determining the plurality of PRS identities comprises selecting the plurality of PRS identities such that PRSs generated using the plurality of PRS identities are time-frequency orthogonal.

4. The method of claim 1, wherein the obtaining the first frequency reuse factor comprises receiving the frequency reuse factor from another network node.

5. The method of claim 1, wherein the obtaining the first frequency reuse factor comprises determining the frequency reuse factor based on: a geographic deployment of the TPs, radio characteristics of the TPs, historical information related to RSTD reports from the wireless device for the respective TPs, a capability of handling the plurality of PRS identities associated with the wireless device, and/or a coverage class of the wireless device.

6. The method of claim 1:
    wherein the network node is a base station controlling the TP for which the RSTD value is received;
    further comprising scheduling the TP to transmit PRSs to the wireless device, where the PRSs are generated using the plurality of PRS identities for the TP in accordance with the transmitted configuration.

7. The method of claim 1, further comprising, before transmitting the configuration of PRSs, transmitting information to the wireless device informing that the configuration will indicate a plurality of PRS identities for respective TPs.

8. The method of claim 1, further comprising receiving information from the wireless device indicating whether all or a subset of PRSs generated using the plurality of PRS identities for the TP was used for determining the received RSTD value.

9. A method, performed by a wireless device, for reporting a reference signal time difference (RSTD) value to a network node of a wireless communication network, the method comprising:
    receiving a configuration of positioning reference signals (PRSs) from the network node, the configuration indicating a plurality of PRS identities for respective transmission points (TPs) of the wireless communication network; wherein the plurality of identities are derived using a first frequency reuse factor for PRSs that is lower than a default second frequency reuse factor;
    determining an RSTD value for a TP based on the received configuration, and
    reporting the determined RSTD value for the TP to the network node.

10. The method of claim 9:
    further comprising receiving PRSs generated using the plurality of PRS identities from the TP in accordance with the received configuration; and
    wherein the RSTD value for the TP is determined based on the received PRSs.

11. The method of claim 10, wherein the RSTD value for the TP is determined using all or a subset of the received PRSs.

12. The method of claim 10, wherein the determining the RSTD value for the TP comprises combining channel estimates for all or a subset of the received PRSs and determining the RSTD value based on the combined channel estimates.

13. The method of claim 10, further comprising transmitting information to the network node indicating whether all or a subset of the received PRSs were used for determining the RSTD value.

14. The method of claim 9, further comprising, before receiving the configuration of the PRSs, receiving information from the network node informing that the configuration will indicate a plurality of PRS identities for respective TPs, wherein the information is used for receiving the configuration.

15. A network node for a wireless communication network, configured to receive a reference signal time difference (RSTD) value from a wireless device, the network node comprising:
    processing circuitry;
    memory containing instructions executable by the processing circuitry whereby the network node is operative to:

obtain a first frequency reuse factor for positioning reference signals (PRSs) that is lower than a default second frequency reuse factor;

transmit a configuration of PRSs to the wireless device, the configuration indicating a plurality of PRS identities for respective transmission points (TPs) of the wireless communication network;

receive an RSTD value for a TP from the wireless device determined based on the configuration of PRSs; and determine the plurality of PRS identities for the respective TPs based on the obtained first frequency reuse factor, wherein the determined plurality of PRS identities are indicated in the transmitted configuration.

16. A wireless device configured to report a reference signal time difference, RSTD, value to a network node of a wireless communication network, the wireless device comprising:

processing circuitry;

memory containing instructions executable by the processing circuitry whereby the wireless device is operative to:

receive a configuration of positioning reference signals (PRSs) from the network node, the configuration indicating a plurality of PRS identities for respective transmission points (TPs) of the wireless communication network; wherein the plurality of identities are derived using a first frequency reuse factor for PRSs that is lower than a default second frequency reuse factor;

determine an RSTD value for a TP based on the received configuration; and report the determined RSTD value for the TP to the network node.

* * * * *